Figure 1:
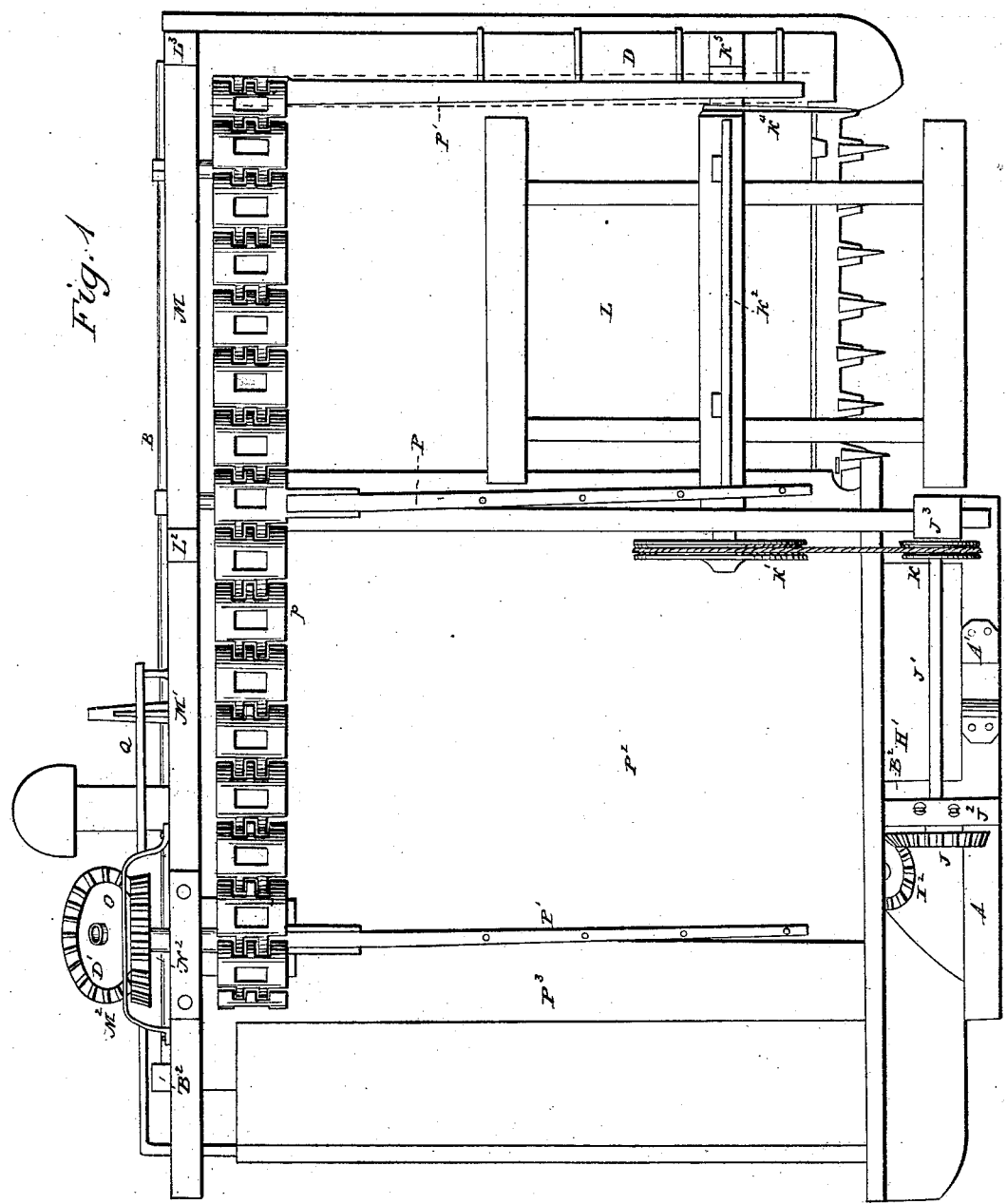

3 Sheets—Sheet 1.

N. CLUTE.

Harvester Rake.

No. 22,163.

Patented Nov. 30, 1858.

N. CLUTE.
Harvester Rake.

No. 22,163.

3 Sheets—Sheet 3.

Patented Nov. 30, 1858.

UNITED STATES PATENT OFFICE.

NICHOLAS CLUTE, OF DUNNSVILLE, NEW YORK.

IMPROVEMENT IN HARVESTERS.

Specification forming part of Letters Patent No. 22,163, dated November 30, 1858.

*To all whom it may concern:*

Be it known that I, NICHOLAS CLUTE, of Dunnsville, in the county of Schenectady and State of New York, have invented certain new and useful Improvements in Harvesters; and I do hereby declare that the same is described and represented in the following specification and drawings.

To enable others skilled in the art to make and use my improvements, I will proceed to describe their construction and operation, referring to the drawings, in which the same letters indicate like parts in each of the figures.

Figure 2:
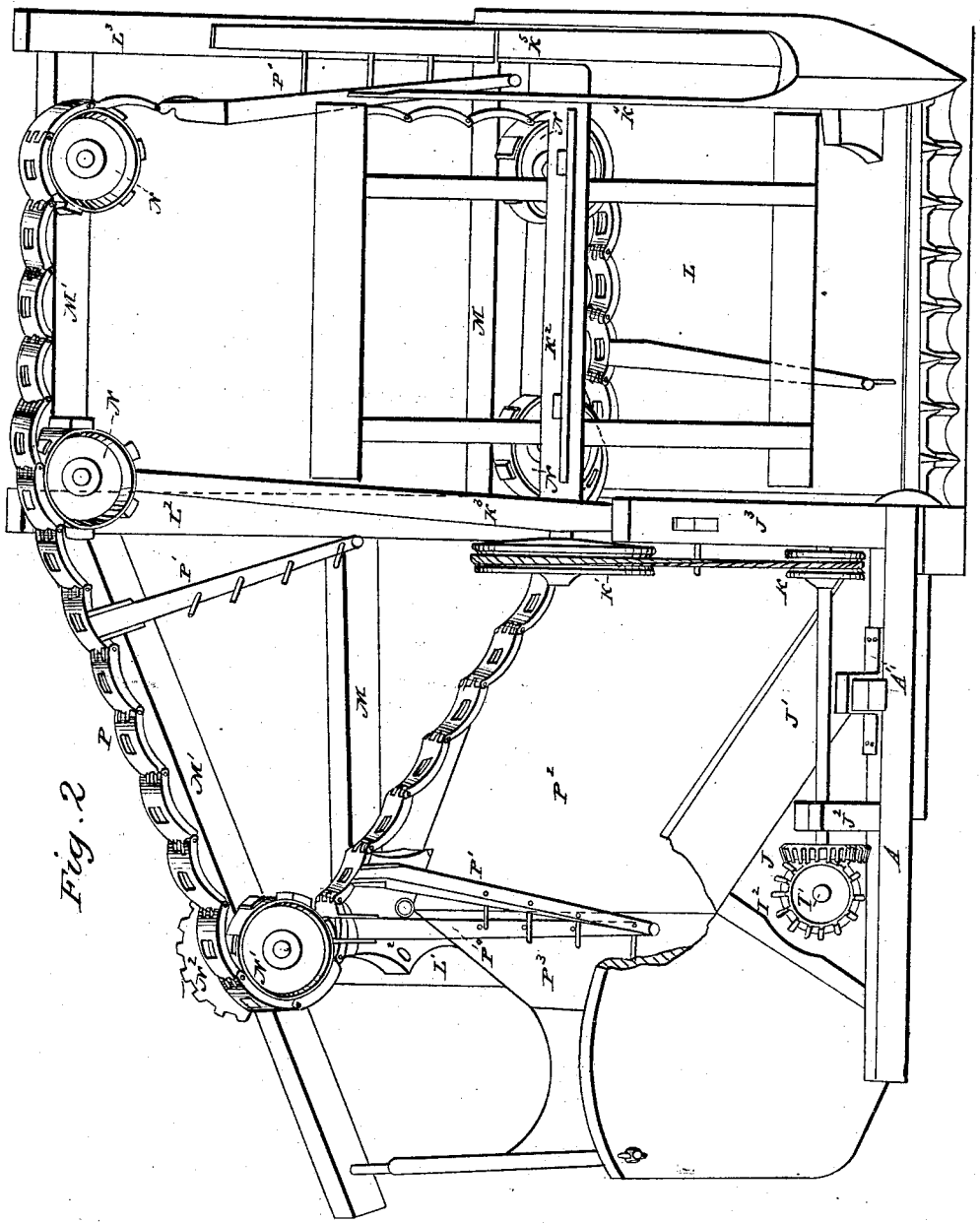
Figure 3:
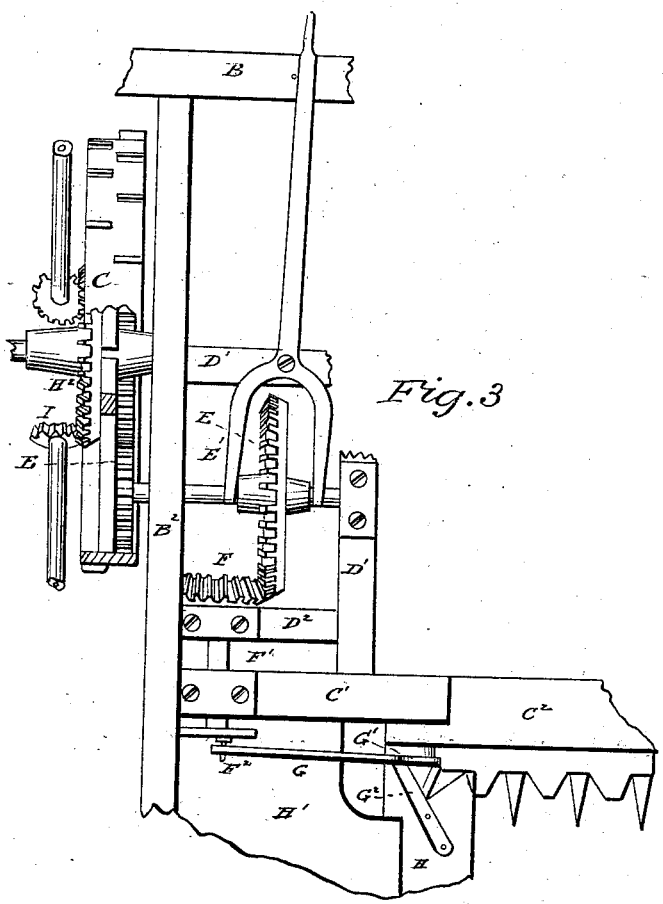
Figure 4:

Figure 1 is a plan or top view of a machine with my improvements. Fig. 2 is a perspective view of the front. Fig. 3 is a plan of a portion of the frame and gearing. Fig. 4 is the end of the cutter or sickle bar with the link attached.

The nature of my improvements in harvesters consists in constructing and arranging the several parts, substantially as hereinafter described, so as to make the rakes pass over and around the reel, and in arranging a pulley under the chain that carries the rakes, so as to tip or vibrate them at a proper time to let the grain fall freely.

In the accompanying drawings, A is the front bar of the frame, to which the tongue is connected by the bracket A', so as to vibrate. The front bar, A, is connected to the rear bar, B, by the side bar B' and middle bar, $B^2$, between which bars the driving-wheel C is arranged, the journals of its shaft turning in boxes fastened to the under side of the bars B' $B^2$. The bar C' is fastened to the bar $B^2$, and firmly connected to the top of the finger-bar $C^2$. The opposite end of the finger-bar is connected to the side bar D. (Shown in dotted lines in Fig. 1.) This side bar D is fastened to the rear bar, B, and is supported by a small wheel turning on a stand fastened to said bar. The bar D', Fig. 3, is fastened to the bar C' and to the rear bar, B. It is also connected to the bar $B^2$ by the girders D' $D^2$. The wheel C, Fig. 3, is represented as partially broken away to show the internal gear that drives the gear E and shaft E', arranged to turn in boxes on the bars $B^2$ and D', and carry the bevel-gear $E^2$, which drives the pinion F on the crank-shaft F', which turns in boxes on the girder $D^2$ and bar C', and carries the crank $F^2$.

G is a link connecting the crank to the end of the cutter-bar G', (see Fig. 4,) which is an elevation of the crank-link, and the end of the cutter-bar, which has a bracket on it to which the link is connected, with a slot under the bracket for the end of the bar $G^2$, Fig. 3, on which the slot traverses, so as to steady and guide the end of the cutter-bar as it is traversed by the link and crank, and at the same time strengthen the end of the cutter-bar and prevent it from breaking as soon as it otherwise would do if made in the ordinary form. The bar $G^2$ is fastened to the draw-shoe H, which connects the front bar, A, to the finger-bar $C^2$, so as to hold both firmly together. The end of the cutter-bar $C^2$ terminates at the left side of the draw-shoe H, and the bar C' is applied to the top of the cutter-bar, which allows the cutter-bar to be carried lower than the bar C' to adapt the machine to uneven ground and allow the bar C' to pass over the grass or grain cut at a previous swath.

I connect the inside of the bar A to the under side of the bar C' by a plate of boiler-iron, H', which forms a boot to protect the crank and link from the stubble or previous swath. The bevel-gear $H^2$ is fastened to the wheel C, and turns the pinion I and shaft I', which turns in boxes fastened to the side bar, B', and carries the gear $I^2$ to drive the gear J and shaft J', which turns in the box $J^2$ and standard $J^3$, and carries the pulley K, which carries a band to turn the pulley K' and turn the reel $K^2$, which turns in the bar $K^3$ and standard $K^4$ to swing the heads of the grain over the platform L as the machine is operated.

To support the raking apparatus I erect three posts, L' $L^2$ $L^3$, on the rear bar, B, and connect them by the girders M M and top bars, M' M' to form a frame for the sprocket-wheels N N N, which turn on studs fastened in this frame, except the wheel N', which is fastened to a shaft which turns in the top bar, M', and bracket $M^2$, and is carried by the gear $N^2$, acted on by the gear O on the shaft O', which shaft has a gear on its opposite end that is turned by the gear $H^2$ on the wheel C. The chain P is made to pass around the sprocket-wheels N N, and some of the links of this chain are provided with projections, between which the rakes P' P' are fastened, so as to be carried around by the chain P and rake the grain from the platform L and carry it up the incline-plane $P^2$, (which covers the driving-wheel and gearing,) and delivers it to the gavel-box P³, and when sufficient is collected to form a sheaf the driver lets down the lever Q and swings the outer side of the box open and lets the gavel fall, and then raises the lever again to close the box. The reel K² is placed so far back and the rakes extend so far forward that they pass entirely around the reel, and pass down beyond it, between the standards K⁴ and K⁵, and between the standing and cut grain, and come onto the platform L, outside of the grain lying upon it, and rake it with a clean sweep into the gavel-box, and when a rake arrives at the top of the incline plane P² the pulley O², which turns on a stud in the girder M, tips the link of the chain and rake into the position shown at P⁴, Fig. 2, so as to turn the rake-teeth to an opposite position to that shown in black, so that the straw and grain will fall freely into the gavel-box and clear of the rake-teeth.

Having described my improvements, I will now state what I claim and desire to secure by Letters Patent, as follows:

1. The construction and arrangement of the several parts, substantially as herein described, for the purpose of allowing the ends of the rakes to pass over and around the reel, in the manner and for the purpose specified.

2. The pulley O², when arranged to tip or vibrate the rake-teeth at the top of the inclined plane, as described, and release the grain and straw and let it fall into the trough or box, substantially as specified.

NICHOLAS CLUTE.

Witnesses:
J. DENNIS, Jr.,
J. F. CALLAN.